United States Patent
Lundström et al.

(10) Patent No.: US 10,934,192 B2
(45) Date of Patent: Mar. 2, 2021

(54) METHOD OF RECOVERING COPPER FROM A DILUTE METAL CONTAINING SOLUTION

(71) Applicant: Aalto University Foundation sr, Aalto (FI)

(72) Inventors: Mari Lundström, Aalto (FI); Kirsi Yliniemi, Aalto (FI)

(73) Assignee: Aalto University Foundation sr, Aalto (FI)

( * ) Notice: Subject to any disclaimer, the term of this patent is extended or adjusted under 35 U.S.C. 154(b) by 55 days.

(21) Appl. No.: 16/471,586

(22) PCT Filed: Dec. 19, 2017

(86) PCT No.: PCT/FI2017/050910
§ 371 (c)(1),
(2) Date: Jun. 20, 2019

(87) PCT Pub. No.: WO2018/115580
PCT Pub. Date: Jun. 28, 2018

(65) Prior Publication Data
US 2020/0377393 A1 Dec. 3, 2020

(30) Foreign Application Priority Data
Dec. 20, 2016 (FI) ..................................... 20165997

(51) Int. Cl.
| | | |
|---|---|---|
| *C02F 1/70* | (2006.01) | |
| *C02F 1/461* | (2006.01) | |
| *C25C 1/12* | (2006.01) | |
| *C25C 1/06* | (2006.01) | |
| *C25C 1/20* | (2006.01) | |
| *C02F 103/10* | (2006.01) | |
| *C02F 101/20* | (2006.01) | |

(52) U.S. Cl.
CPC .......... *C02F 1/705* (2013.01); *C02F 1/46109* (2013.01); *C25C 1/06* (2013.01); *C25C 1/12* (2013.01); *C25C 1/20* (2013.01); *C02F 2001/46138* (2013.01); *C02F 2001/46152* (2013.01); *C02F 2101/20* (2013.01); *C02F 2103/10* (2013.01)

(58) Field of Classification Search
CPC ...................................................... C02F 1/705
See application file for complete search history.

(56) References Cited

U.S. PATENT DOCUMENTS

| | | |
|---|---|---|
| 2004/0055694 A1 | 3/2004 | Kershaw et al. |
| 2010/0089763 A1 | 4/2010 | Darron et al. |

FOREIGN PATENT DOCUMENTS

| | | |
|---|---|---|
| EP | 0074167 A1 | 3/1983 |
| GB | 190707698 A | 11/1907 |
| WO | WO2016151949 A1 | 9/2016 |

OTHER PUBLICATIONS

Drogui et al: Review of Electrochemical technologies for Environmental Applications. Recent Patents on Engineering 2007, vol. 1, No. 3, pp. 257-272.

(Continued)

*Primary Examiner* — Peter Keyworth
(74) *Attorney, Agent, or Firm* — Laine IP Oy

(57) ABSTRACT

The invention relates to a method of removing and/or recovering metals from a dilute metal containing solution. In particular, the invention concerns a method for recovering copper from a dilute copper-iron bearing mining water, particularly from a copper-iron bearing mining wastewater.

18 Claims, 2 Drawing Sheets

(56) References Cited

OTHER PUBLICATIONS

Gomes et al: Utilization of electrochemical techniques for copper removal, speciation, and analysis in aqueous systems. ECS Transactions, 2010, vol. 28 (18), pp. 59-68.
Kim et al: Cu nanofilm formation by electrochemical atomic layer deposition (ALD) in the presence of chloride ions. Journal of Electroanalytical Chemistry and Interfacial Electrochemistry, Sep. 15, 2008, vol. 621, No. 2, pp. 205-213.
Venkatraman et al: Electrochemical Atomic Layer Deposition of Copper: A Lead-Free Process Mediated by Surface-Limited Redox Replacement of Underpotentially Deposited Zinc. Journal of the Electrochemical Society, May 6, 2016, vol. 163, No. 12, pp. D3008-D3013.
Brankovic et al: Metal monolayer deposition by replacement of metal adlayers on electrode surface. Surface Science, 2001, vol. 474. pp. L173-L179.
Rajak et al: Investigation of Ferromagnetic Layer Dissolution Characteristics During Pulse electrodeposition of FeCoNiCu/Cu Multilayers. Russian Journal of Electrochemistry, 2014. vol. 50, pp. 27-31.
Thambidurai et al: Copper Nanofilm Formation by Electrochemical ALD. Journal of the Electrochemical Society, 2009. vol. 156, pp. D261-D268.
Thambidurai et al: E-ALD of Cu Nanofilms on Ru/Ta Wafers Using Surface Limited Redox Replacement. Journal of the Electrochemical Society, 2010. vol. 157, pp. D466-D471.
Viyannalage et al: Epitaxial Growth of Cu on Au(111) and Ag(111) by Surface Limited Redox Replacement—An Electrochemical and STM Study. Journal of Phys. Chem. C., 2007. vol. 111, No. 10, pp. 4036-4041.

METHOD OF RECOVERING COPPER FROM A DILUTE METAL CONTAINING SOLUTION

FIELD OF THE INVENTION

The field of the invention relates to a method of removing and/or recovering metals from a dilute metal containing solution. In particular, the invention concerns a method for recovering copper from a dilute copper-iron bearing mining water, particularly from a copper-iron bearing mining wastewater.

BACKGROUND OF THE INVENTION

Wastewater from abandoned sulphide mines is considered as harmful waste for the environment. Mines containing sulphidic minerals end up suffering from acidic metal containing waters with time, when minerals or ore body are exposed to air and water. Several mine waters need to be treated in order to prevent metal(s) ending up to nature as acid drainage or bleed water, potentially killing aquatic animals and plants. In the USA, 5-10% of the abandoned mines are considered to be health and safety hazards and 1-2% to present an environmental risk due to water pollution. Also in developing countries the regulation is getting stricter, and health and safety issues are getting more appreciated. Already for the above mentioned reasons metals need to be removed from wastewater and it needs to be done as cost effectively as possible. Moreover, it would be beneficial to provide a method for recovering metals (such as copper) from mining waters for further use, and preferably energy efficiently also when said metals are present at very low concentrations.

Currently acidic mine wastewaters can be treated by several methods, such as lime neutralization, calcium silicate neutralization, photocatalytic methods, electrocoagulation, carbonate neutralization, ion exchange, constructed wetlands, biomethods and sulfide precipitation.

In electrodeposition (also known as electrowinning in metal industry) metals are deposited from the solutions directly on the electrode surface, using external applied potential or current. In metallurgy, the metals are deposited from pregnant leaching solutions (PLS) of their ores. However, electrowinning of for example copper as a high purity product from mining waters where it is present at low concentrations is challenging and economically unfeasible.

Moreover, in metallurgical processes cementation is known as a reduction process in which the less noble metal is added (often as a powder and in excess) to the pregnant leach solution to precipitate more noble metal ions present in PLS, resulting in solid residue rich in more noble metals.

US 2004/0055694 A1 discloses electrochemical processes for removal of heavy metals from industrial wastewaters produced by enterprises using chromium compounds, non-ferrous metallurgy and electro-galvanic coatings. Said processes are alleged to handle low and medium concentrations of heavy metals, when heavy metal containing wastewater is passed through an electroreactor containing two three-electrode stacks and a three-phase alternating current is applied to the solution.

In US 2010/0089763 A1, copper containing acid mine drainage solutions are treated by performing a redox reaction in aqueous medium under conditions that change valence of a second metal in the aqueous medium, and thereafter electrolytically depositing copper on a flow-through electrode. According to this document, the process can recover various metals at low or moderate concentrations, e.g. at concentrations less than 1000 ppm.

EP 0074167 A1 relates to an electrolytic process for the removal of one or more metal contaminants from wastewater. For example, copper and zinc cations were removed from a plating plant effluent rinse water stream by plating said metal cations onto the cathode.

However, none of these publications aims to recover copper or more noble metals from dilute metal containing solutions such as mining waters using repeated electrodeposition and redox replacement method, with a lower energy consumption compared to conventional electrodeposition or electrowinning, particularly when said metals are present at low concentrations.

The innovative feature in this invention is that the redox replacement used in this invention differs from typical cementation process as no additional metal needs to be introduced to the solution: impurity metal present in the mining water (for example iron) is acting as a reducing agent for the recovered metal (such as copper) after impurity metal has been electrodeposited on the electrode. The equilibrium potential impurity metal on the electrode | impurity metal ion in solution is taken as an advantage in electrodeposition after which the impurity metal is utilized in redox replacement.

Electrodeposition-redox replacement method (and related methods such as surface-limited redox replacement (SLRR) or electrodeposition-galvanic replacement) has been introduced in scientific literature earlier. Brankovic et aL (2001) have published a groundbreaking paper of surface-limited redox replacement where Cu was used as a sacrificial metal, and submonolayers, monolayers or bilayers of Pt, Ag and Pd were prepared.

L. T. Viyannalage et al. (2007) and J. Y. Kim et al. (2008) have used SLRR method for copper deposition, using Pb as a sacrificial metal in a one-pot set-up while C. Thambidurai et al. (2010) used Ru/Ta wafers in flow cell conditions for Cu nanofilm formation by SLRR. C. Thambidurai et al. (2009) studied also the effect of cycling for smoothness of deposited copper, using Pb as sacrificial element. K. Venkatraman (2016) has introduced a Pb free method for copper deposition and in this case, underpotential deposited Zn was used as a sacrificial layer.

Also, S. Rajak et aL (2014) have studied formation of ferromagnetic FeCoNiCu/Cu layers—in laboratory scale—in which two-step pulse electrodeposition was followed by spontaneous galvanic displacement, though in this application the displacement reaction was unwanted and tried to be reduced.

Nevertheless, none of these publications is using SLRR or related methodology for copper recovery from impure mining waters and using mainly iron as sacrificial metal; in the above mentioned publications, Pb is mostly used as a sacrificial metal for copper deposition, all solutions are synthetic and the research aim is to create functional surfaces and coatings for laboratory scale measurements. In this invention, however, the methodology is developed for copper removal and/or recovery from dilute copper-iron bearing solutions such as mining waters, a task in which copper recovery by electrochemical methods has not been an industrially attractive option.

SUMMARY OF THE INVENTION

The main aspect of the invention is to enable the recovery and/or removal of copper from mining waters, where it is present at low concentrations (preferably <100 ppm), without any additional chemical consumption. This is done by an electrodeposition-redox replacement method (ED RR), which preferably includes cycling between electrodeposition and redox replacement steps. Moreover, this invention enables the removal/recovery of copper at lower energy consumption than by electrowinning.

The objects of the invention are achieved by a method, which is characterized by what is stated in the independent claim. Further embodiments of the invention are disclosed in the dependent claims.

An object of the present invention is therefore a method of recovering and/or removal of copper and optionally more noble metals from a dilute copper-iron bearing solution such as a mining water, comprising:
a) an electrodeposition (ED) step, wherein an external potential or current is applied to an electrode placed in the dilute copper and iron bearing solution, depositing iron and optionally copper on the electrode,
b) a redox replacement (RR) step, wherein the applied external potential or current used in step a) is cut-off and iron deposited on the electrode reduces spontaneously the copper still present in the solution, resulting in a deposit which contains copper and possible iron;
c) optionally repeating steps a) and b); and
d) recovering copper and possible more noble metals from the electrode.

In a preferred embodiment of the invention, cycling between the electrodeposition step and the redox replacement step takes place. The number of cycling between the ED and RR steps can be varied. After the appropriate number of cycling between EDRR steps, the product rich in copper and/or other compounds—which have a higher redox potential than sacrificial iron—is achieved.

Another object of the invention is the use of electrodeposition-redox replacement method (EDRR) for removal and recovery of copper from mining waters, particularly from mining waters which have a Fe/Cu concentration ratio that is >10.

A further object of the invention is the use of electrodeposition-redox replacement cycling method (EDRR) i.e. steps a), b) and optionally c) and d) above for removal and recovery of copper and more noble metals from mining water solutions wherein the solution comprises also more noble metals than copper. More noble metals, metal complexes and compounds can also be subject to the redox replacement along copper and can be removed and/or recovered.

Traditionally, the metals present in copper and iron bearing mining waters are not recovered as a metal containing product. In general, chemicals are used to remove metals from the mining waters. Traditionally, the lower the copper concentration present in the solution is, the more energy is needed to recover copper by electrowinning. Also, electrowinning is not commonly considered as an economically viable method for recovering copper from dilute copper and iron containing solutions such as mining waters. This invention, outstandingly when compared to electrowinning/electrodeposition, is more energy effective particularly when iron/copper ratio is high (higher than 10). Actually, iron present in the mining water at relatively high concentrations (Fe:Cu >10) enables a low energy recovery of copper and higher Fe:Cu ratio can even improve the efficiency of the method.

Therefore, considerable advantages are achieved by the method of the present invention. The fact that copper present in a mining water at low concentration (<100 mg/l) can be recovered with low energy consumption is notable. The recovery of copper from dilute copper-iron containing solutions such as mining waters as a high purity product has been challenging and economically unfeasible with current electrochemical methods such as electrowinning. One advantage of the method according to the present invention is that the energy used for iron deposition during electrodeposition step is utilized for spontaneous copper replacement. A further advantage of the method is that no additional chemical is needed for copper recovery and no additional ions such as $Na^+$ or sulphate is subjected into the mining water in this stage. Further advantages of the present invention include e.g. low formation of waste and low operating expenses. Copper recovered by the method of the invention can be used as a raw material for a copper smelter or other copper recycling process and, in this stage, any leftover iron possibly present in the deposit is not problematic for a typical copper smelting process.

Other objects and features of the invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Some results of the Examples are presented with reference to the attached drawings, in which.

DETAILED DESCRIPTION OF THE INVENTION

Figure 1:
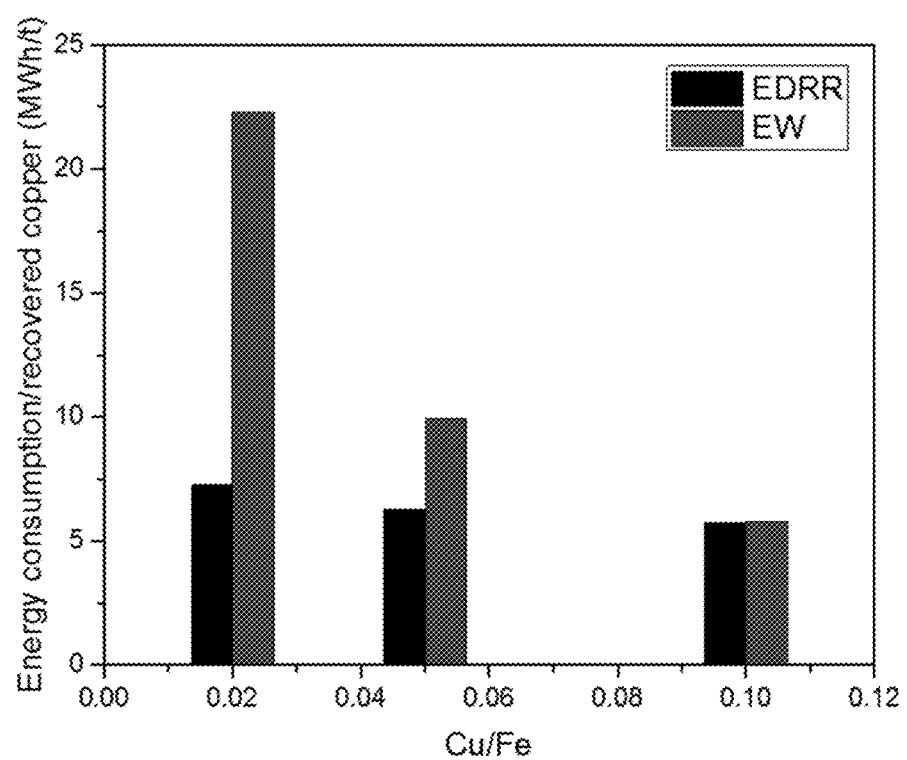
FIG. 1 illustrates comparison of energy consumption of the method according to the invention (EDRR) and traditional electrowinning (EW) with stainless steel working electrode and 2000 ml solution volume.

The invention is based on a two-step electrochemical process wherein in a preferred embodiment cycling between the two steps takes place. The first step is an electrodeposition step (ED) where metals are deposited on the electrode surface by applying an external potential or current. In this invention the deposited metal is primarily iron but other metals can also deposit in smaller quantities during this step. The potential or current and the deposition time can be varied.

The second step is called a redox replacement step (RR). In this step, the deposited iron and other less noble metals at the electrode surface spontaneously reduce copper still present in an aqueous phase such as mining water and copper deposits on the electrode. Additionally, other more noble metals or metal complexes present in solution can be reduced and subsequently deposited on the electrode by deposited iron and any other less noble metal present in the deposit. Such metals, metal complexes and/or compounds can be for example dissolved noble metal or arsenic bearing compounds. During redox replacement step, no external potential or current is applied. The redox replacement step is finished either when pre-determined time or pre-determined open circuit potential is achieved.

The present method is especially suitable for recovering copper from impure mining waters or mining wastewaters, which contain iron and have a low copper content. The copper-iron bearing aqueous solution used as a starting material in the present method typically originates from a sulphide mineral mine (acid mine drainage) or it can originate as a bleed or tailing water from a concentrator, from a flotation plant, from an abandoned mine or a leaching plant after metal recovery.

The method of the invention can be applied to dilute copper-iron containing aqueous solutions, such as mining waters, wherein the solution has a Fe/Cu concentration ratio which is 4<Fe/Cu<40000, preferably 4<Fe/Cu<4000, even more preferably 4<Fe/Cu<400. The method of the invention is particularly applicable to solutions in which the iron concentration in ratio to copper, or the iron concentration in ratio to copper and more noble metals, is high (Fe/Cu>10 or Fe/(Cu and more noble metals)>10). In one embodiment of the invention, Fe/Cu ratio is >20. However, the method can be applied also to mining waters wherein Fe/Cu ratio is <10, more precisely 4<Fe/Cu<10.

The method of the present invention can be applied for removal, for recovery and/or both for removal and recovery of copper and more noble metals, metal complexes or compounds than copper from a copper-iron bearing solution.

Since copper is more noble than metals commonly present in impure mining waters, such as for example iron and zinc, it is possible to use redox replacement for recovery of copper. More noble metals than copper present in the mining waters can also be subject to the redox replacement along copper and can be removed and/or recovered.

Mining water refers in this context to any copper and iron bearing aqueous solution that originates from a mineral mine, particularly from a sulphide mineral mine. Mining waters from sulphide mines are acidic, typically having a pH below 7, or more typically less than 4, even more typically less than 2. Preferably a mining water or a dilute copper-iron containing solution refers to a water solution wherein the iron concentration in the solution is >10 ppm, typically >20 ppm, more typically >100 ppm, even more typically 100-5000 ppm. The copper concentration in the solution is typically less than 100 ppm, or less than 50 ppm, more typically <25 ppm, even more typically 0.2-10 ppm and still more typically 0.002-5 ppm. Said solution can contain more noble metals than copper at very low concentrations. Typically the concentration of other more noble metals, metal complexes or compounds in the solution is <1 ppm, more typically <0.1 ppm and even more typically below the detection limit (<0.2 ppb). Typically such mining water has also other metals, such as Zn, Pb, Na, Ca, Al, Cd, but not restricted to those. Typically such mining waters do not include high concentration (<0.5 M) of cyanide, chloride, sulphate or thiosulphate.

In the mining waters iron is typically present as a soluble iron ion or complex or soluble iron oxide, iron having typically a valence of +II or +III. Soluble copper in the solution is typically present in the valence of +II, however also valence of +I can be present.

The mining water can be continuously flowing, stagnant, stirred or pumped when the method is applied. The method can be applied as a continuous process or as a batch process. The method can be applied at a mine site, at an accompanied plant or even at remote locations.

In order to recover copper from a mining water, electrodes are immersed in the mining water in a suitable vessel, pool, tank etc. or in-situ in the mine, abandoned mine, bleed solution, leak solution, outlet etc., and cycling between electrodeposition and redox replacement steps is preferably performed. The method can be done at three-electrode set-up (working electrode (WE)=electrode at which the product is formed; counter electrode (CE) and reference electrode (RE)) or in two-electrode set-up (working electrode (WE) and counter electrode (CE)).

An electrode is in electrical contact with an external potential or current source. The electrodes may be made of any suitable conductive material as long as the material can stand the environmental conditions without corrosion. Preferred electrode materials include La, Pt and stainless steel. The electrodes may have any suitable shape, such as plate, ring, sheet, mesh, stick or any other applicable form.

During the electrodeposition step an external potential or current is applied on the working electrode and mainly iron but also possibly copper and other metals are deposited on the working electrode, resulting in iron-rich deposit on the working electrode.

It is possible to conduct the electrodeposition step at a constant current or at a constant potential. It is also theoretically and practically possible to deposit iron varying the potential or current in a range in which iron deposits on the electrode.

The deposition potential and time can be varied. Typically the potential in the electrodeposition step is such that iron can deposit on the electrode and hydrogen evolution does not destroy the deposition. Typically the potential of the electrode is in the range of capable of depositing iron and typically, before hydrogen evolution potential. The exact potential range depends on the electrode material and dilute iron-copper bearing solution such as mining water in question but for example for Pt electrodes the potential is typically less than +0.2 V vs. SCE (saturated calomel electrode), typically in between +0.2 and −0.7 V vs. SCE, more typically 0.0 V and −0.65 V vs. SCE, and even more typically −0.1 V and −0.6 V vs. SCE. The current density in the electrodeposition step has an absolute value in the range of 0.01-1000 mA/cm$^2$, more typically in the range of 0.01-300 mA/cm$^2$, even more typically 0.01-200 mA/cm$^2$, still more typically 0.01-100 mA/cm$^2$. The residence time of the electrodes in the solution under the applied external potential or current during one electrodeposition step is typically less than 10 h, typically in the range of 1 s-10 h, for example 1 s-1 h, or 1 s-60 s.

After the electrodeposition step, the current or potential is switched off and a redox replacement step takes spontaneously place: during the RR step iron and less noble metals are replaced by copper and other more noble metals. This results in a copper-rich layer on the working electrode. Once a pre-determined open circuit potential of the working electrode or a pre-determined time is achieved during the RR step, the next electrodeposition step may commence; now the iron and possibly other metals are deposited on the working electrode which has already the copper-rich layer on the surface from the previous cycle. After this step, another redox replacement step follows and cycling between the ED and RR steps can be continued until the copper-rich electrode is removed from the mining water and copper is recovered from it by conventional means such as leaching. Also, it is possible to stop any of the steps while the step is still ongoing. The cycling can also be stopped either after the ED step or the RR step. It is also possible to have several ED steps before the RR step or steps and vice versa.

The pre-determined open circuit potential value in a redox replacement step is typically selected to be below copper stripping potential value. Open circuit potential means the potential of the electrode when no external potential or current is applied:

open circuit potential is dictated by the environmental factors such as the composition of the solution, the surface composition of the electrode and possible reactions taking place in the electrode. The pre-determined open circuit potential value at which the redox replacement step is finished depends on the electrode material and the mining water in question but it is typically below the copper stripping potential. For Pt electrodes the values are typically less than 0.5 V vs. SCE, more typically between 0.5 and −0.3 V vs. SCE, even more typically 0.3 V and −0.2 vs. SCE, even more typically 0.25 and −0.1 V. vs. SCE.

A redox replacement step can be finished before the pre-determined open circuit potential is reached. Typically in such cases the cut-off times are less than 24 hours, more typically 3 s-12 hours, even more typically 3 s-1 h, even more typically 3 s-30 min. This time is dependent also on the mass transfer in the solution and can be altered e.g. by stirring or pumping the solution.

During the redox replacement step, electrons are transferred from deposited iron and other possible deposited metals to copper ions and/or complexes and other more noble metal ions and/or compounds still present in the solution. As a result, the deposited iron (and other metals releasing electrons) is oxidized and dissolved back to the solution while copper and more noble metals are reduced and deposited on the working electrode. The spontaneous reduction of copper and oxidation of iron consumes no electricity, even if copper is majorly recovered during this redox replacement step. Due to this reason energy consumption for copper recovery is lower than when using electrowinning (see Example 1), particularly when Fe:Cu ratio is above 10 (in other words: Cu/Fe<0.1).

After the redox replacement step copper has been enriched on the electrode. It was surprisingly found out that—without any cementation chemical addition—when repeating electrodeposition and redox replacement consecutively, copper was effectively enriched from real mining water solution ([Fe]=27.2 mg/dm$^3$, [Cu]<0.2 mg/dm$^3$, pH=3, possibly minor amounts of other impurities (<0.2 mg/dm$^3$) such as Pb, Ni, Cd, As), as is shown in Example 2. Also, it was observed that cycling did not affect the quality of the copper product (Example 3).

Typically steps a) and b) are repeated consecutively several times (also called cycling between the steps or pulsing), typically 1 to 100000 times, more typically 10-50000 times, even more typically 100-50000 times, even more typically 500-10000 until the desired product containing copper and possibly more noble metals, is achieved. Thus, after the redox replacement step b) a new step a) is performed, wherein the external potential or reducing current is applied again and after that a new step b) is presented by switching off the applied potential or current. The parameters used in the second or further rounds may be the same or different from those of the first or previous rounds, falling in the ranges presented. This cycling or 'pulsing' between electrodeposition and redox replacement enriches copper to the electrode surface more efficiently than traditional electrowinning.

Finally, the deposited metal(s) can be recovered from the electrode either after step a) or b) or subsequent to repeating steps a) and b), by methods known by person skilled in art, such as leaching, hydrometallurgical method, pyrometallurgical method, chemical stripping, physical stripping or electrochemical stripping for recovering copper and possible more noble metals from the electrode.

EXPERIMENTAL

Example 1. Energy Consumption

Energy consumption of the method according to the present invention (EDRR) and a traditional electrowinning method (EW) were tested in copper recovery from synthetic solutions having a Cu/Fe ratio of 0.02, 0.05 and 0.1 (copper concentration of 2, 5 or 10 ppm and Fe concentration of 100 ppm).

Recovery of copper on stainless steel working electrode (area 16 cm$^2$) was performed in 2000 ml of solution (solution parameters: [Fe]=100 mg/L, [Cu]=1-10 mg/L, [H$_2$SO$_4$]= 10 g/L, pH=1), with magnetic stirring at 400 rpm. A standard calomel electrode (SCE) was acting as a reference electrode (RE) and stainless steel as a counter electrode (CE).

Solution samples were taken at the following time points: before, 1, 5, 10, 20, 30, and 60 min, and the amount of copper was detected by ICP. In EDRR, the potential applied to the electrode during the electrodeposition (ED) step was −0.55 V vs. SCE ($E_{deposition}$=−0.55 V vs. SCE), the deposition time was 10 s, the cut-off potential for redox replacement (RR) step was −0.1 V vs SCE ($E_{cutoff}$=−0.1 V vs. SCE) and the number of cycles investigated was 1000. In EW, 10000 s deposition time at −0.55 V was used, i.e. the total deposition time spent at the −0.55 V vs. SCE is the same for both EDRR and EW methods.

As can be seen in FIG. 1, the method of the invention (EDRR) has a lower energy consumption/recovered copper than traditional electrowinning (EW) when Cu/Fe ratio <0.1 (in other words, Fe/Cu>10). When Cu/Fe=0.10, the method is still comparative with traditional EW method.

The method was tested also at a smaller scale, using platinum electrodes both as a working electrode (0.4 cm$^2$) and counter electrode in 150 ml of solution (same composition) and standard calomel electrode (SCE) as a reference electrode. The solution was stirred at 400 rpm.

Solution samples were taken at the following time points: before, 10 min, 60 min, and after. The potential applied to the electrode during the ED step was −0.45 V vs. SCE ($E_{deposition}$=−0.45 V) when copper concentration was 2 mg/L and −0.55 V vs. SCE ($E_{deposition}$=−0.45 V) when copper concentration was 5 or 10 mg/L. At lower Cu concentration less negative deposition potential is used due to hydrogen evolution. The deposition time was 10 s, cut-off potential for RR step −0.1 V vs SCE ($E_{cutoff}$=−0.1 V) and number of cycles 10 for all measurements.

The results from experiments applying 1000.10 s electrodeposition and redox replacement (EDRR) vs. 10000 s electrowinning (EW) in 2000 ml of copper-bearing solution with stainless steel electrodes are shown in Table 1. Table 2 shows the results from the corresponding experiments in 150 ml of copper-bearing solution with platinum electrodes.

TABLE 1

Energy consumption of 1000 · 10 s EDRR vs. 10000 s EW. Stainless steel electrodes, 2000 ml solution. EDRR parameters: deposition potential = −0.55 V vs. SCE, deposition time = 10 s, cut-off potential for RR step = −0.1 V vs SCE, number of cycles = 10. EW parameters: deposition potential = −0.55 V vs. SCE, deposition time = 10 000 s.

| Cu (ppm) | Cu/Fe | Method | Copper removed (mg) | Energy consumption (J) | J/mg |
|---|---|---|---|---|---|
| 2 | 0.02 | EDRR | 0.8 | 20 | 25 |
| 2 | 0.02 | EW | 0.6 | 50 | 80 |
| 5 | 0.05 | EDRR | 2.3 | 50 | 20 |
| 5 | 0.05 | EW | 1.1 | 40 | 35 |
| 10 | 0.1 | EDRR | 4.5 | 90 | 20 |
| 10 | 0.1 | EW | 3.1 | 60 | 20 |

TABLE 2

Energy consumption of 1000 · 10 s EDRR vs. 10000 s EW. Platinum electrodes, 150 ml solution. EDRR parameters: deposition potential = −0.55 V vs. SCE when copper concentration 5 or 10 mg/L and −0.45 V vs. SCE when copper concentration 2 mg/L, deposition time = 10 s, cut-off potential for RR step = −0.1 V vs. SCE, number of cycles = 10. EW parameters: deposition potential = −0.55 V vs. SCE, deposition time =10 000 s.

| Cu (ppm) | Cu/Fe | Method | Copper removed (mg) | Energy consumption (J) | J/mg |
|---|---|---|---|---|---|
| 2  | 0.02 | EDRR | 0.1 | 4  | 30 |
| 2  | 0.02 | EW   | 0.1 | 10 | 90 |
| 5  | 0.05 | EDRR | 0.3 | 6  | 20 |
| 5  | 0.05 | EW   | 0.2 | 7  | 30 |
| 10 | 0.1  | EDRR | 0.6 | 9  | 10 |
| 10 | 0.1  | EW   | 0.6 | 10 | 20 |

Example 2. Quality of the Product (Tests from Synthetic Mine Waters and from a Real Mining Water)

The method was tested in synthetic solutions with additional impurities (e.g. Zn, Al, Pb), i.e. mimicking real mine waters. The composition of 10 g/l $H_2SO_4$ solutions is shown in Table 3, together with the achieved product quality (Cu/Fe) after applying EDRR method in each synthetic mine water solution. The product quality was determined by SEM-EDX analysis from Pt working electrode after 10 EDRR cycles ($E_{ED}$=−0.45 V vs. SCE for Solutions 1 & 2 and $E_{ED}$=−0.50 V vs. SCE for Solution 3, time of the step=10 s for each solution, $E_{cut-off}$=0.30 V vs. SCE for each solution) while using Pt sheet as working electrode (0.4 $cm^2$), Pt sheet as counter electrode and standard calomel electrode (SCE) as reference electrode.

TABLE 3

Synthetic mine waters and achieved product quality from SEM analysis

| Solution Composition | [Cu] (ppm) | [Fe] (ppm) | [Zn] (ppm) | [Al] (ppm) | [Pb] (ppm) | Product Quality from SEM (Cu/Fe) |
|---|---|---|---|---|---|---|
| Solution 1 | 100 | 4000 | 80 | —  | —  | 1.9 |
| Solution 2 | 100 | 4000 | 80 | 50 | —  | 2.2 |
| Solution 3 | 100 | 4000 | 80 | 50 | 2  | 2.7 |

As can be seen, increasing amount of impurities in synthetic dilute metal containing solutions did not prevent the functionality of the invented method, but actually increased the product quality.

Also, the method was tested for real mining water with 27.2 $mg/dm^3$ Fe and less than 0.2 $mg/dm^3$ of Cu, pH=3. The mining water may also contain minor amounts of impurities (<0.2 $mg/dm^3$ each) such as Pb, Ni, Cd and As. The EDRR parameters were the following: electrodeposition potential $E_{ED}$=−0.55 V vs. SCE, time of the step=10 s, redox replacement cut-off potential $E_{cut-off}$=0.20 V vs. SCE and the number of cycles was 10. The achieved product quality, i.e. Cu/Fe ratio was 2.8 (determined by SEM-EDX analysis from Pt electrode surface).

This shows that using the invented method, copper could be recovered from a real mining water in which copper was present at very low concentrations (<0.2 $mg/dm^3$) compared to iron (27.2 $mg/dm^3$).

Example 3. Effect of Cycling Between the Steps

The effect of cycling on the quality of the product was investigated in a synthetic solution ([Cu]=100 mg/L, [Fe]=4 $g/dm^3$, pH=1.2, [$H_2SO_4$]=10 g/L). The chemicals used for preparing the solution were $FeSO_4.7H_2O$, $CuSO_4.5H_2O$ and concentrated $H_2SO_4$. Electrodeposition potential was −0.60 V vs. SCE, deposition time 10 s, and cut-off potential for redox replacement step +0.25 V vs. SCE. The working electrode was Pt sheet (0.4 $cm^2$ area), counter electrode was Pt sheet and reference electrode a standard calomel electrode (SCE).

Figure 2:
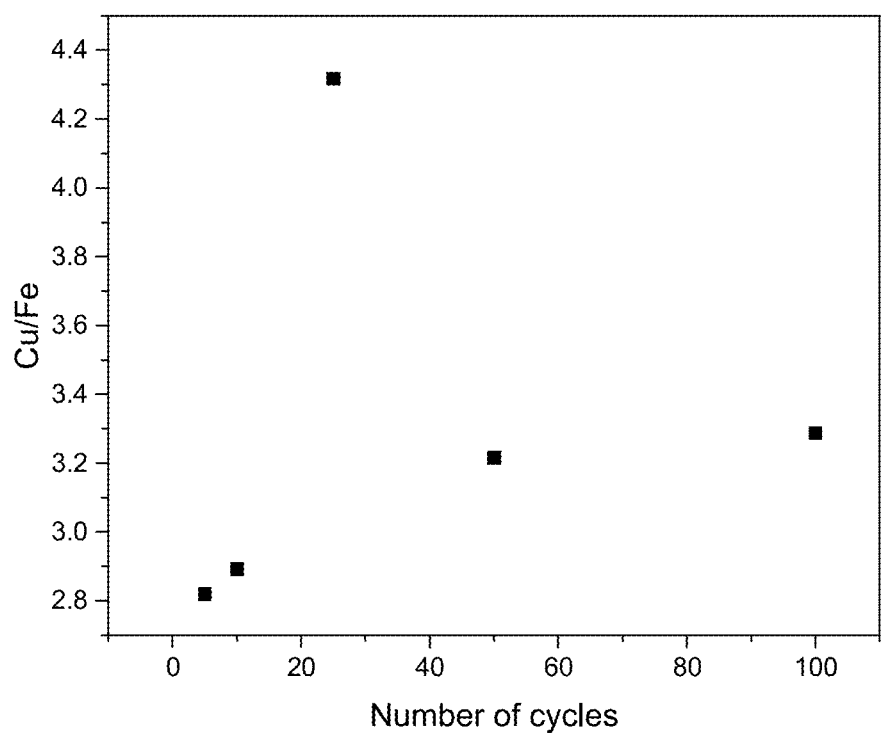
FIG. 2 illustrates the purity of the product (shown as Cu/Fe ratio) as a function of number of EDRR cycles.

The results in FIG. 2 show that the quality of copper product (shown as Cu/Fe ratio) is not effected by the number of cycles, but the copper concentration is approximately three times higher compared to iron regardless of the number of cycles.

Thus, while there have been shown and described and pointed out fundamental novel features of the invention as applied to a preferred embodiment thereof, it will be understood that various omissions and substitutions and changes in the form and details of the method and device may be made by those skilled in the art without departing from the spirit of the invention. For example, it is expressly intended that all combinations of those elements and/or method steps which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

PATENT LITERATURE

US 2004/0055694 A1
US 2010/0089763 A1
EP 0074167 A1

Non-Patent Literature

S. R. Brankovic, J. X. Wang, R. R. Adžić, "Metal monolayer deposition by replacement of metal adlayers on electrode surfaces" *Surface Science*, 474 (2001), p. L173.

J. Y. Kim, Y.-G. Kim, J. L. Stickney "Cu nanofilm formation by electrochemical atomic layer deposition (ALD) in the presence of chloride ions", *J Electroanal Chem*, 621 (2008) 205-213.

S. Rajak, C. Srivastava, A. C. Bidaye, and S. K. Ghoshz, "Investigation of Ferromagnetic Layer Dissolution Characteristics During Pulse Electrodeposition of FeCoNiCu/Cu Multilayers" *Russian Journal of Electrochemistry* 50 (2014) 27-31.

C. Thambidurai, D. K. Gebregziabiher, X. H. Liang, Q. H. Zhang, V. Ivanova, P. H. Haumesser, J. L. Stickney, E-ALD of Cu Nanofilms on Ru/Ta Wafers Using Surface Limited Redox Replacement, *J Electrochem. Soc.* 157 (2010), D466-D471.

C. Thambidurai, Y. G. Kim, N. Jayaraju, V. Venkatasamy, J. L. Stickney "Copper Nanofilm Formation by Electrochemical ALD", *J. Electrochem. Soc.* 156 (2009) D261-D268.

K. Venkatraman, R. Gusley, L. Yu, Y. Dordi, R. Akolkar, "Electrochemical Atomic Layer Deposition of Copper: A Lead-Free Process Mediated by Surface-Limited Redox Replacement of Underpotentially Deposited Zinc" *Journal of the Electroanalytical Chemistry* 163 (2016) D3008-D3013.

L. T. Viyannalage, R. Vasilic, N. Dimitrov, "Epitaxial growth of Cu on Au(111) and Ag(111) by surface limited redox replacement—An electrochemical and STM study", *J Phys Chem C* 111 (2007) 4036-4041.

The invention claimed is:

1. A method of recovering and/or removal of copper from a copper-iron containing solution comprising:
    a) an electrodeposition step, wherein an external potential or current is applied to an electrode placed in the copper-iron containing solution, thereby depositing iron and optionally copper on the electrode;
    b) a redox replacement step, wherein the applied external potential or current used in step a) is cut-off and iron deposited on the electrode reduces spontaneously the copper still present in the solution, resulting in a deposit on the electrode which contains copper and possible iron;
    c) optionally repeating steps a) and b); and
    d) recovering copper from the electrode.

2. The method according to claim 1, wherein the copper-iron containing solution has an iron concentration which is >10 ppm.

3. The method according to claim 1, wherein the copper-iron containing solution has a copper concentration which is less than 100 ppm.

4. The method according to claim 1, wherein the copper-iron containing solution has a Fe/Cu concentration ratio, which is 4<Fe/Cu<40000.

5. The method according to claim 1, wherein the copper-iron containing solution is a mining water, and wherein the copper-iron containing solution further comprises noble metals, metal complexes, or compounds which are subjected to the redox replacement step along with copper and can be removed and/or recovered with the copper.

6. The method according to claim 5, wherein the mining water has a concentration of the noble metals, metal complexes or compounds of less than 1 ppm.

7. The method according to claim 1, wherein the copper-iron containing solution originates from a sulphide mineral mine, as a bleed or tailing water from a concentrator, from a flotation plant, from an abandoned mine, or from a leaching plant after metal recovery.

8. The method according to claim 1, wherein the electrode(s) are in a form selected from the group consisting of a plate, ring, sheet, mesh, and stick.

9. The method according to claim 1, wherein the electrodeposition step is conducted at a constant current, at a constant potential, or by varying the potential or current in a range in which iron deposits on the electrode.

10. The method according to claim 1, wherein an external potential is applied in the electrodeposition step, and wherein the external potential in the electrodeposition step is such that iron can deposit on the electrode and hydrogen evolution does not destroy the deposition.

11. The method according to claim 1, wherein an external potential is applied in the electrodeposition step, wherein the electrode comprises a platinum electrode, and wherein the applied potential is less than +0.2 V vs. SCE (saturated calomel electrode).

12. The method according to claim 1, wherein a current is applied in the electrodeposition step, and wherein an absolute value of a current density in the electrodeposition step is in the range of 0.01-1000 $mA/cm^2$.

13. The method according to claim 1, wherein step a) has a residence time which is 1 second-60 minutes.

14. The method according to claim 1, wherein the redox replacement step b) is finished after a pre-determined time or when an open circuit potential value reaches a pre-determined value.

15. The method according to claim 1, wherein the electrode comprises a platinum electrode, and wherein the redox replacement step b) is finished when an open circuit potential value reaches a predetermined value, which is below 0.5 V vs. SCE (saturated calomel electrode).

16. The method according to claim 1, wherein the redox replacement step b) is finished after a pre-determined time period that allows the replacement of iron to copper to take place, and wherein the pre-determined time period comprises 3 seconds-30 minutes.

17. The method according to claim 1, wherein steps a) and b) are repeated consecutively (cycled) 1 to 100000 times before the recovering copper from the electrode.

18. The method according to claim 1, wherein the electrode obtained after step a), after step b), or subsequent to cycling between steps a) and b), is subjected to leaching, a hydrometallurgical method, a pyrometallurgical method, chemical stripping, physical stripping or electrochemical stripping for recovering copper and possible noble metals from the electrode.

* * * * *